(12) United States Patent
Olesko et al.

(10) Patent No.: US 7,556,281 B2
(45) Date of Patent: Jul. 7, 2009

(54) STAMPED AIRBAG RETENTION MEMBERS AND METHOD OF AIRBAG ASSEMBLY

(75) Inventors: Michael J Olesko, Ann Arbor, MI (US); Joseph J. Mannino, Bloomfield Hills, MI (US); Peter Vigeant, Troy, MI (US); William Henry Travis, New Albany, IN (US)

(73) Assignee: Toyoda Gosei Co., Ltd., Aichi (JP)

( * ) Notice: Subject to any disclaimer, the term of this patent is extended or adjusted under 35 U.S.C. 154(b) by 357 days.

(21) Appl. No.: 10/801,977

(22) Filed: Mar. 16, 2004

(65) Prior Publication Data

US 2005/0206132 A1     Sep. 22, 2005

(51) Int. Cl.
   *F16B 21/00* (2006.01)
(52) U.S. Cl. .................................. 280/728.2; 411/552
(58) Field of Classification Search .............. 280/728.2; 74/552; 411/549, 552
   See application file for complete search history.

(56) References Cited

U.S. PATENT DOCUMENTS

| 5,087,069 | A |   | 2/1992  | Corbett et al. |
|-----------|---|---|---------|----------------|
| 5,239,147 | A |   | 8/1993  | Allard et al. |
| 5,303,952 | A |   | 4/1994  | Shermetaro et al. |
| 5,331,124 | A |   | 7/1994  | Danielson |
| 5,350,190 | A | * | 9/1994  | Szigethy ................ 280/728.2 |
| 5,380,037 | A | * | 1/1995  | Worrell et al. .......... 280/728.2 |
| 5,410,114 | A |   | 4/1995  | Furuie et al. |
| 5,459,294 | A |   | 10/1995 | Danielson |
| 5,470,100 | A | * | 11/1995 | Gordon ................. 280/728.2 |
| 5,508,481 | A |   | 4/1996  | Williams et al. |
| 5,508,482 | A |   | 4/1996  | Martin et al. |
| 5,624,130 | A |   | 4/1997  | Ricks |
| 5,630,611 | A |   | 5/1997  | Goss et al. |
| 5,762,359 | A |   | 6/1998  | Webber et al. |
| 5,765,860 | A |   | 6/1998  | Osborn et al. |
| 5,775,725 | A | * | 7/1998  | Hodac et al. ........... 280/728.2 |
| RE36,351  | E |   | 10/1999 | Yamamoto et al. |
| 6,029,992 | A |   | 2/2000  | Vendely et al. |
| 6,082,758 | A |   | 7/2000  | Schenck |
| 6,092,832 | A | * | 7/2000  | Worrell et al. ......... 280/728.2 |
| 6,196,573 | B1|   | 3/2001  | Worrell et al. |
| 6,199,908 | B1|   | 3/2001  | Isomura et al. |
| 6,276,711 | B1|   | 8/2001  | Kurz et al. |
| 6,299,201 | B1| * | 10/2001 | Fujita ..................... 280/731 |
| 6,325,408 | B1| * | 12/2001 | Ford ....................... 280/728.2 |

(Continued)

FOREIGN PATENT DOCUMENTS

JP        10-44914      2/1998

(Continued)

*Primary Examiner*—John Q. Nguyen
*Assistant Examiner*—Timothy Wilhelm
(74) *Attorney, Agent, or Firm*—Jean C. Edwards, Esq.; Akerman Senterfitt

(57) ABSTRACT

The present invention is directed to a bracket that connects an airbag subassembly to a support structure, such as a steering wheel armature. The bracket generally has a base formed from a material and at least two retention members extending from the base wherein the retention members are formed integral with and from the same material as the base. The present invention is also directed a method of forming the bracket.

10 Claims, 12 Drawing Sheets

U.S. PATENT DOCUMENTS

| | | |
|---|---|---|
| 6,354,622 B1 | 3/2002 | Ulbrich et al. |
| 6,457,379 B1 * | 10/2002 | Mirone ........................ 74/552 |
| 6,464,247 B1 | 10/2002 | Laue |
| 6,474,682 B2 | 11/2002 | Ikeda et al. |
| 6,576,837 B1 * | 6/2003 | Pimentel ...................... 174/58 |
| 7,059,631 B2 * | 6/2006 | Schorle et al. .............. 280/731 |
| 7,108,276 B2 * | 9/2006 | Schutz et al. ............ 280/728.2 |
| 2001/0011815 A1 | 8/2001 | Ikeda et al. |
| 2001/0054810 A1 | 12/2001 | Sakane et al. |
| 2002/0043786 A1 | 4/2002 | Schutz |
| 2002/0053786 A1 | 5/2002 | Paonessa |
| 2002/0074781 A1 | 6/2002 | Schutz et al. |
| 2002/0125698 A1 | 9/2002 | Schutz |
| 2002/0153714 A1 | 10/2002 | Kreuzer |
| 2004/0041373 A1 * | 3/2004 | Helmstetter et al. ...... 280/728.2 |
| 2004/0239080 A1 * | 12/2004 | Berrahou et al. ......... 280/728.2 |

FOREIGN PATENT DOCUMENTS

| | | |
|---|---|---|
| JP | 10-244899 | 9/1998 |
| JP | 2001-26249 | 1/2001 |

* cited by examiner

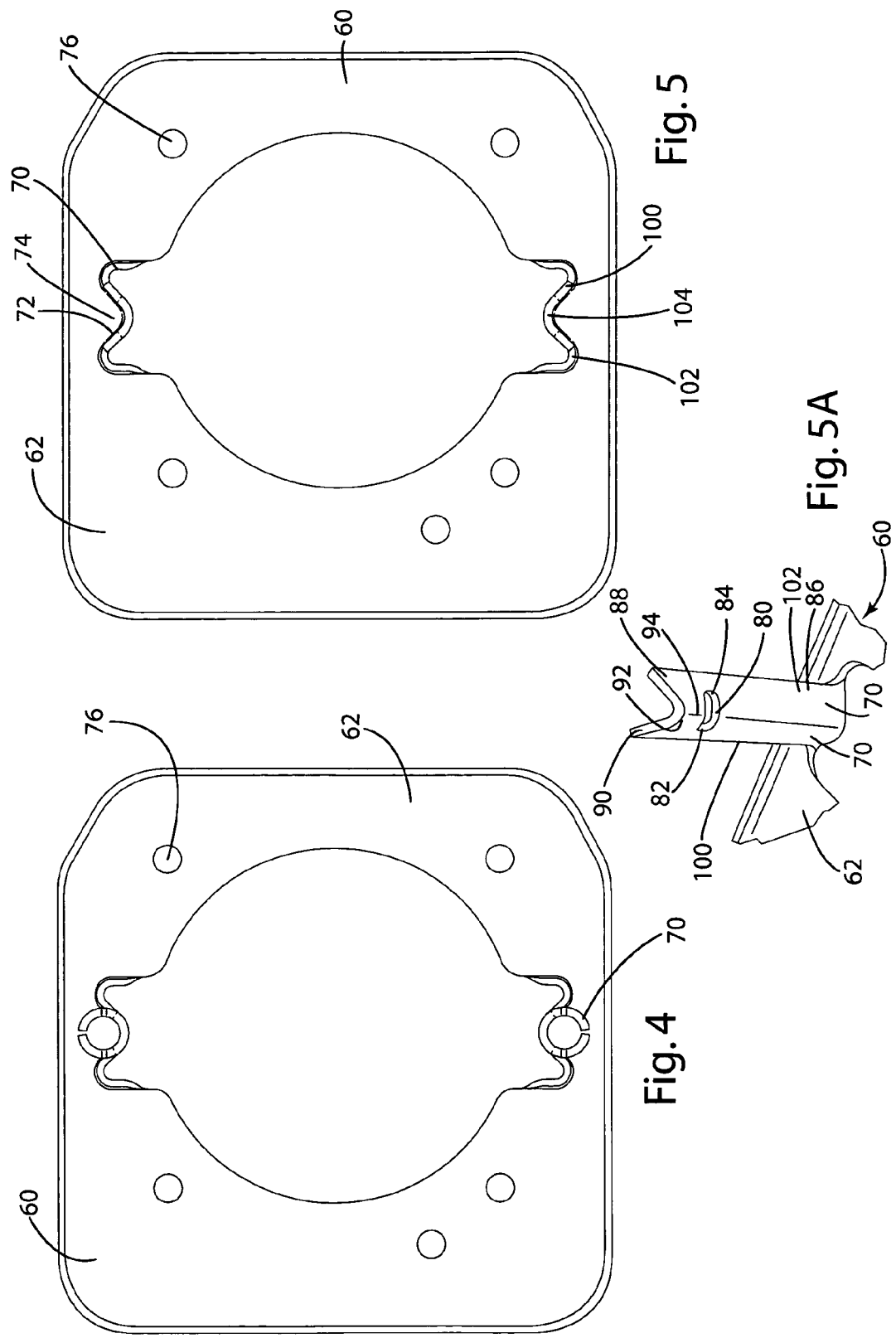

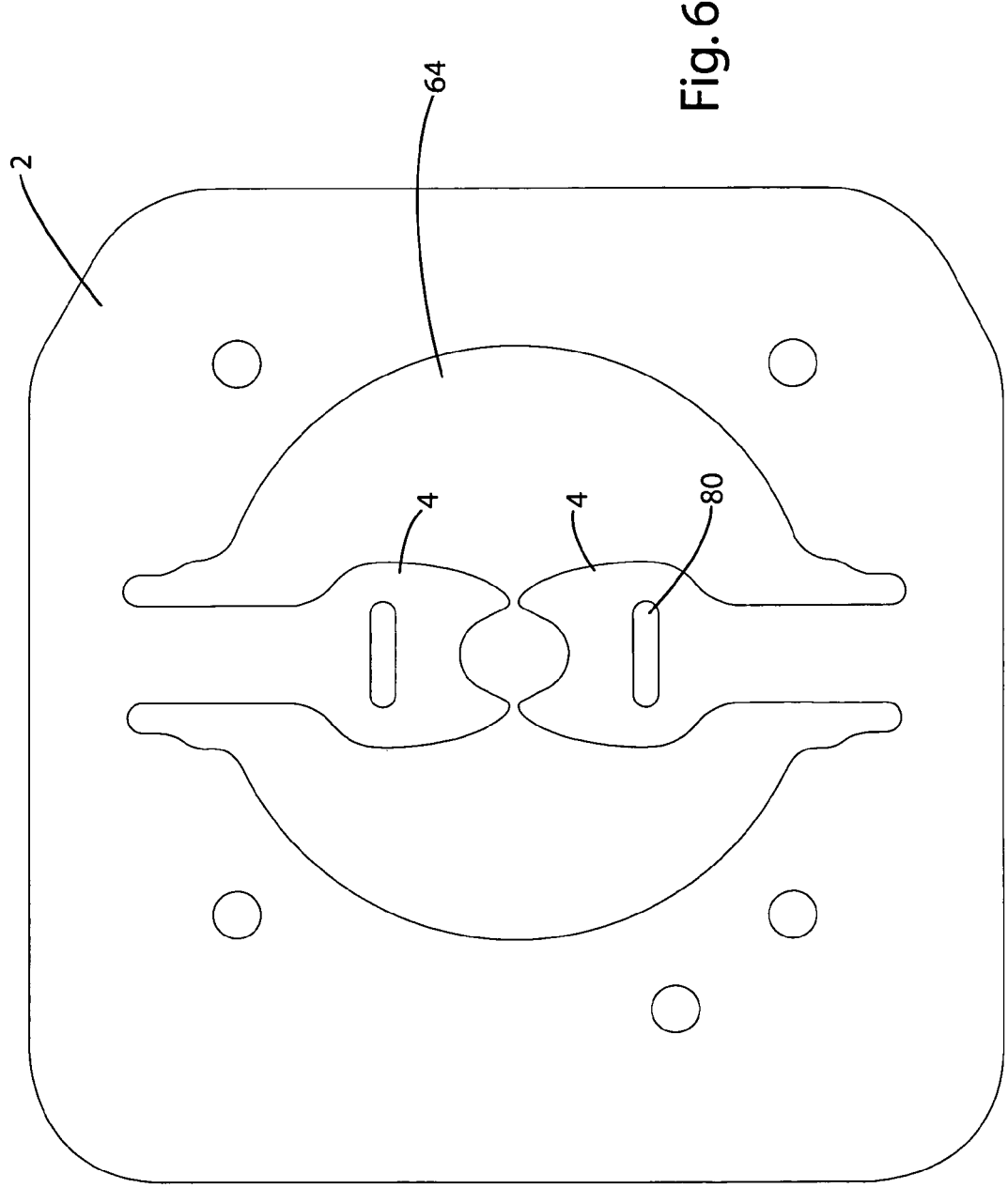

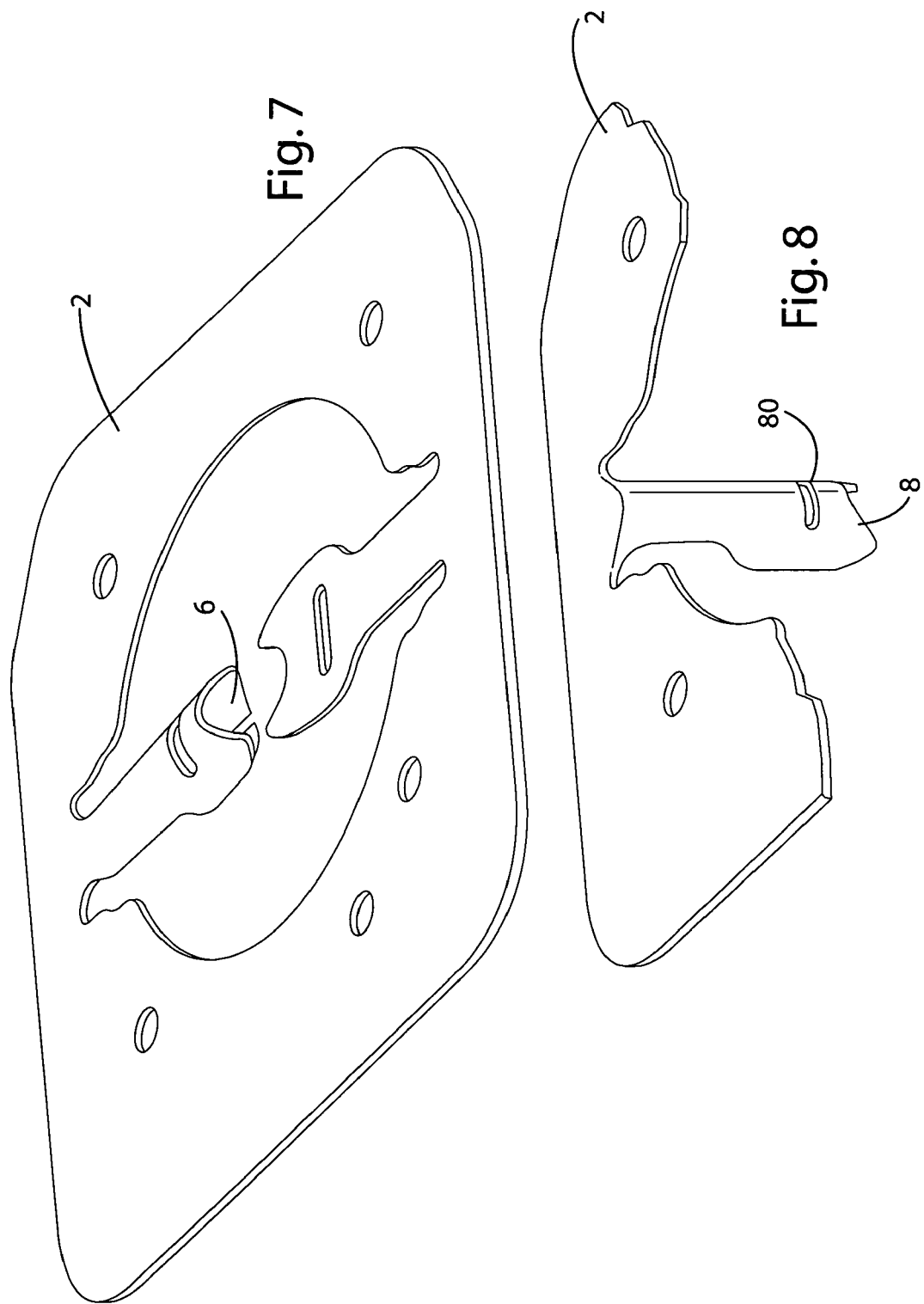

STAMPED AIRBAG RETENTION MEMBERS AND METHOD OF AIRBAG ASSEMBLY

BACKGROUND OF THE INVENTION

1. Technical Field

The present invention is generally directed to a steering wheel airbag assembly for an automobile and more particularly, to a method of forming a mechanism for coupling an airbag subassembly to a steering wheel subassembly.

Current motor vehicles include a variety of occupant safety and restraint systems including driver side airbags (DAB). Traditional these DAB systems have been attached to a steering wheel armature with a nut and bolt fastener assembly. To improve assembly times some manufactures have coupled these DAB systems to the steering wheel armature with retention pins. Typically, the retention pins are individually cold formed into a solid round steel pin and pressed or welded to a bracket on the airbag module. The retention pins include a circumferential groove that is coupled to spring clips on the support structure to couple the airbag module to the support structure. While solid retention pins are generally effective coupling arrangements for DAB systems, a need exists for improvements to reduce cost and weight, improve ease of manufacturing the airbag subassembly by eliminating the separately formed solid pins and reducing the number of parts necessary for coupling the airbag module to the support structure, while also providing pins that are capable of coupling airbag modules to existing support structures.

To address some of the above problems, manufacturers have formed an airbag bracket for an airbag module with flat mounting members. Such flat mounting members are formed in such a manner that during assembly or over time, the flat mounting members may deflect or move thereby causing the members to break off the bracket or become misaligned. Any misalignment of the flat mounting members detracts from the fit and finish of the airbag module within the steering wheel. To use the flat mounting members with conventional support structures, a round bushing is required, thereby requiring extra parts and increasing assembly time. Also, when used in a conventional assembly, the amount of material behind the slot which receives a spring clip is minimal thereby raising potential failure issues during detonation of the airbag module. Therefore, these airbag modules having brackets with flat mounting members do not fully address all of the above problems and require extra parts and assembly time to couple the airbag module to the support structure.

SUMMARY OF THE INVENTION

The present invention includes a number of features that address the deficiencies discussed above. For example, one aspect of the invention is a bracket that includes integral retention members that connect to apertures on a supporting structure. In view of the above, the present invention is directed to a bracket for an airbag subassembly having a base formed from a material and at least two retention members extending from the base and formed integral with and from the same material as the base. The retention members include a surface formed to define a cavity extending approximately perpendicular to the base. The base may define an inflator opening between the retention members. The retention members further define a retention cavity having a first engagement surface and a second engagement surface within the retention cavity. The cavity extending from the base is at least partially located between the first and second engagement surfaces.

The present invention is also directed to a method of forming a bracket for an airbag subassembly for retaining an airbag module on a support structure. The method includes the step of stamping a metal sheet to define an opening and stamped retention members extending into the opening and the step of bending the stamped retention members to form retention members for coupling the metal sheet to the support structure. The step of stamping the metal sheet also defines a retention cavity in the stamped retention members. The step of bending the stamped retention members includes the step of raising the stamped retention members to be approximately perpendicular to the metal sheet and curling the stamped retention members to form a surface defining a cavity extending perpendicular to the metal sheet.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 4 is a bottom view of the sealing plate showing somewhat cylindrical retention members;

FIG. 5 is a bottom view of an alternative embodiment of the sealing plate with angled retention members;

FIG. 5A is a perspective view of the retention members in FIG. 5;

FIG. 6 is a bottom view of the bracket before the retention members are shaped;

FIG. 7 is a perspective view of the bracket showing one of the retention members being shaped;

FIG. 8 is a perspective view of the bracket showing one of the retention members being raised;

DETAILED DESCRIPTION OF THE PREFERRED EMBODIMENT

Figure 1:
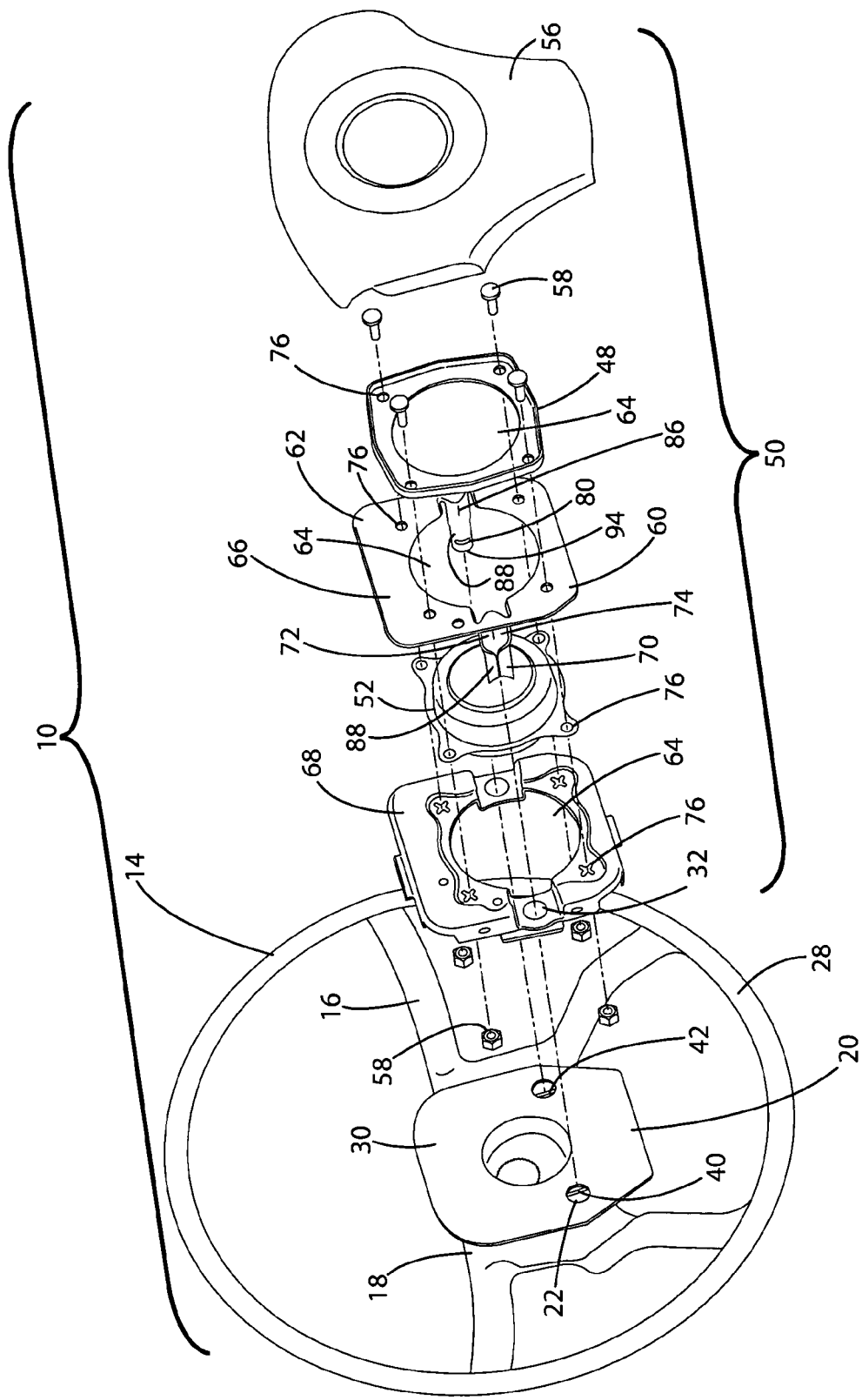
FIG. 1 is an exploded perspective view of the airbag subassembly of the present invention.

As is shown in the drawings, the airbag subassembly 10 of the present invention includes a support structure 20 and an airbag module 50 coupled to the support structure. The airbag module 50 generally includes a bracket 60 for coupling the airbag module to the support structure 20. A fastener assembly 58 may couple an inflator 52, airbag 54, and cover 56 to the bracket 60. The support structure 20 is generally a horn module 30 or a steering wheel armature 28. The bracket 60 includes integral retention members 70 configured to be inserted into apertures 22 defined by the support structure 20. The retention members are retained by a retention mechanism on the support structure. The retention members 70 and retention mechanism cooperate to provide easy assembly of the airbag module 50 to the support structure 20.

Figure 12:
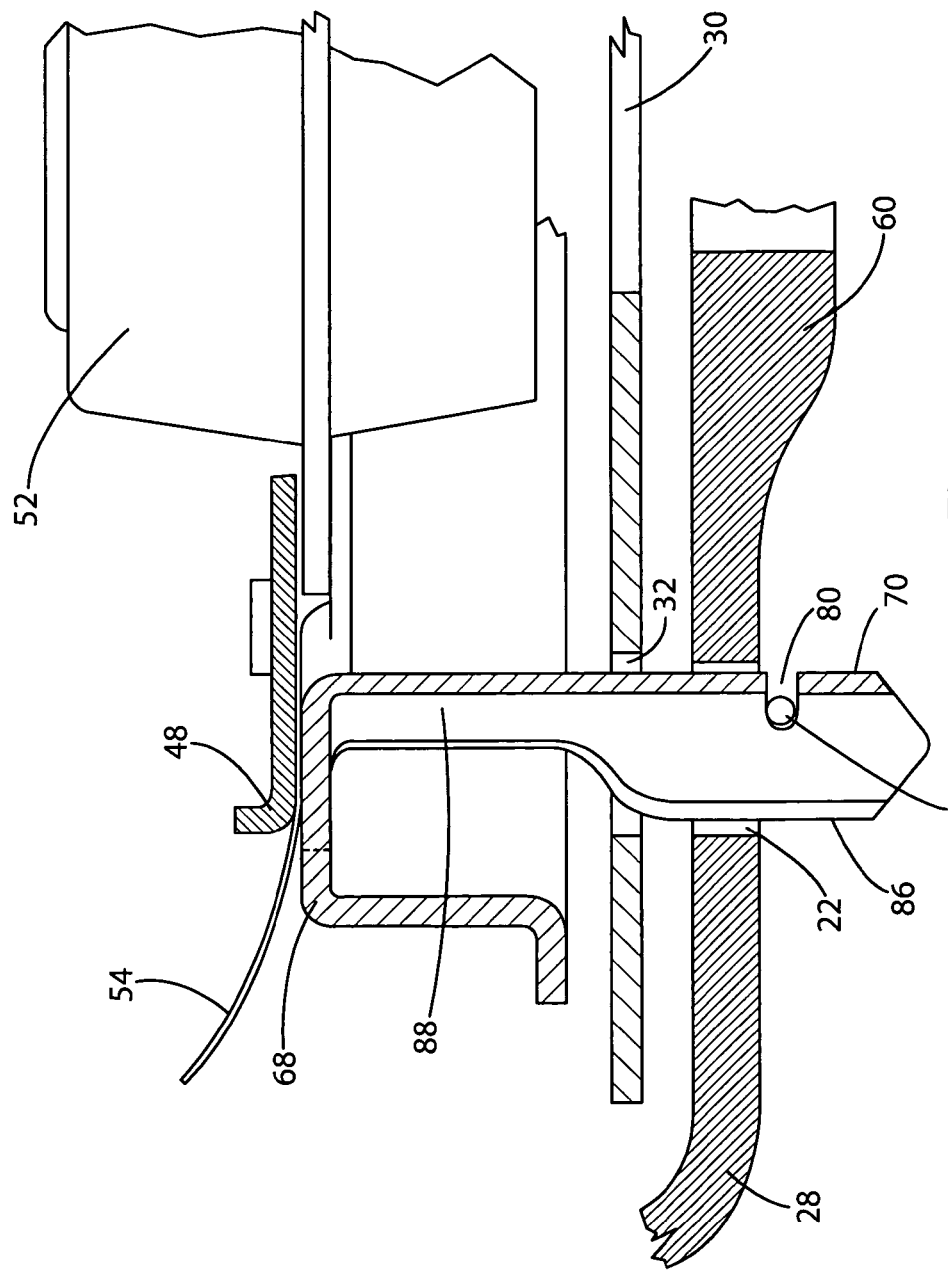
FIG. 12 is a sectional view of a second alternative embodiment showing the retention members being coupled to a steering wheel

The support structure 20 may be formed from a variety of items, but generally is formed from the steering wheel armature 28 or the horn module 30 coupled to the steering wheel armature, or another member (not shown) coupled to the steering wheel armature. The steering wheel armature 28 generally includes a receiving hub 18, spokes 16, and a rim 14. The spokes 16 connect the rim 14 to the hub 18. The horn module 30 may be formed in a variety of configurations and include other components, such as horn contacts, which are not shown. The horn module 30 is secured to the steering wheel armature 28, preferably at the receiving hub 18. The horn module 30 works in conjunction with the air bag module 50 so that an applied force to the entire air bag module closes a circuit to engage the vehicle's horn. The support structure 20 defines apertures 22 for receiving the retention members 70. In the embodiment where the bracket 60 is coupled to the steering wheel armature 28, if the airbag subassembly 10 includes a horn module 30, the horn module includes pin receivers 32 allowing the retention members 70 to pass through (FIG. 12).

Figure 9:
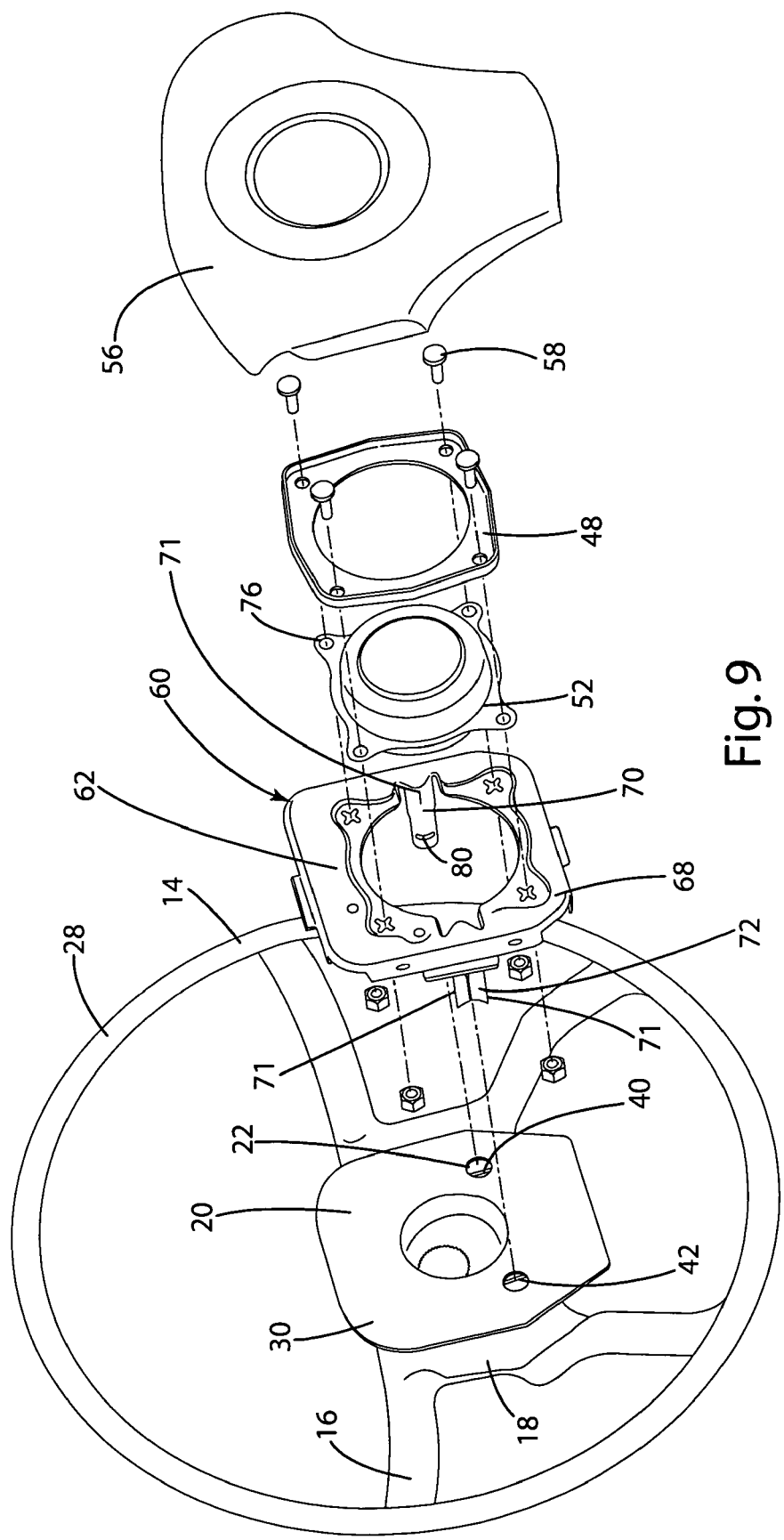
FIG. 9 is an exploded perspective view of a first alternative embodiment.

The support structure 20 further includes a retention mechanism 40 and a retention mechanism holder (not shown). The retention mechanism 40 and retention mechanism holder may take a variety of shapes capable of coupling the retention members 70, and thereby the airbag module 50, to the support structure 20. In the illustrated embodiment, the retention members 70 are releasably coupled to the retention mechanism 40. As illustrated in FIGS. 1-4 and 9-12, the retention mechanism 40 is a spring clip, which allows the retention members to be releasably coupled to the support structure. More specifically, the retention mechanism 40 is generally formed from an elastically deformable and resilient metal spring rod having a first leg 42, a second leg (not shown), and a bend (not shown) connecting the first and second legs. When the retention mechanism 40 is assembled into the holder, the first and second legs provide a preload force against the retention mechanism holder in a rest position. In the rest position, as illustrated in FIGS. 1 and 9, the retention mechanism 40, specifically the first leg 42, partially obscures the apertures 22.

The airbag module 50 includes the front cover 56, the airbag 54, and the inflator 52, as is well known in the art. The front cover 56 is generally configured to provide an aesthetically pleasing cover over the airbag assembly, and is formed and attached in a manner generally known in the art. The inflator 52 and airbag 54 are also formed as well known in the art and take on a variety of configurations depending upon the application.

Figure 2:
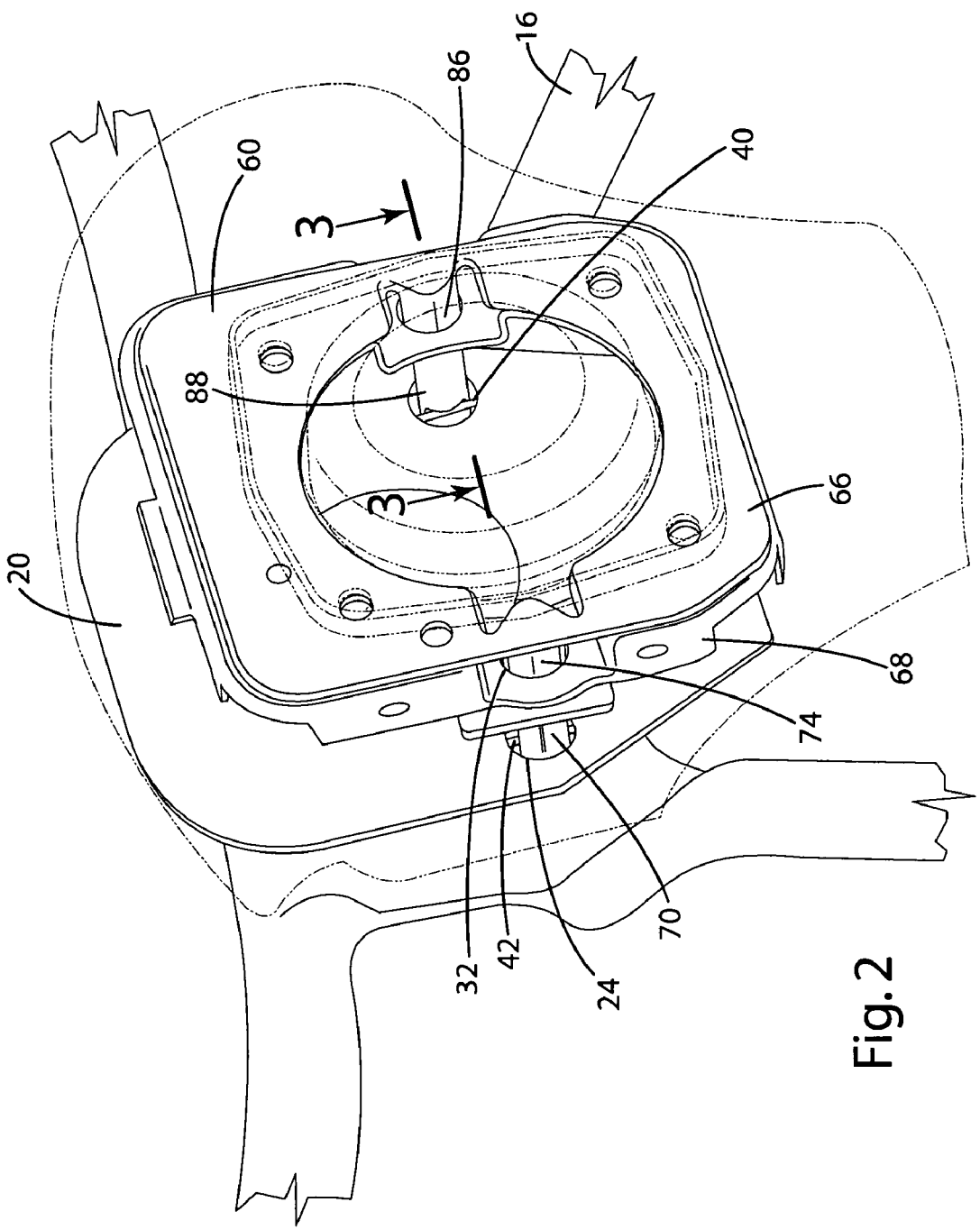
FIG. 2 is a perspective view of the assembled airbag subassembly with portions of the airbag module shown in phantom lines.
Figure 3:
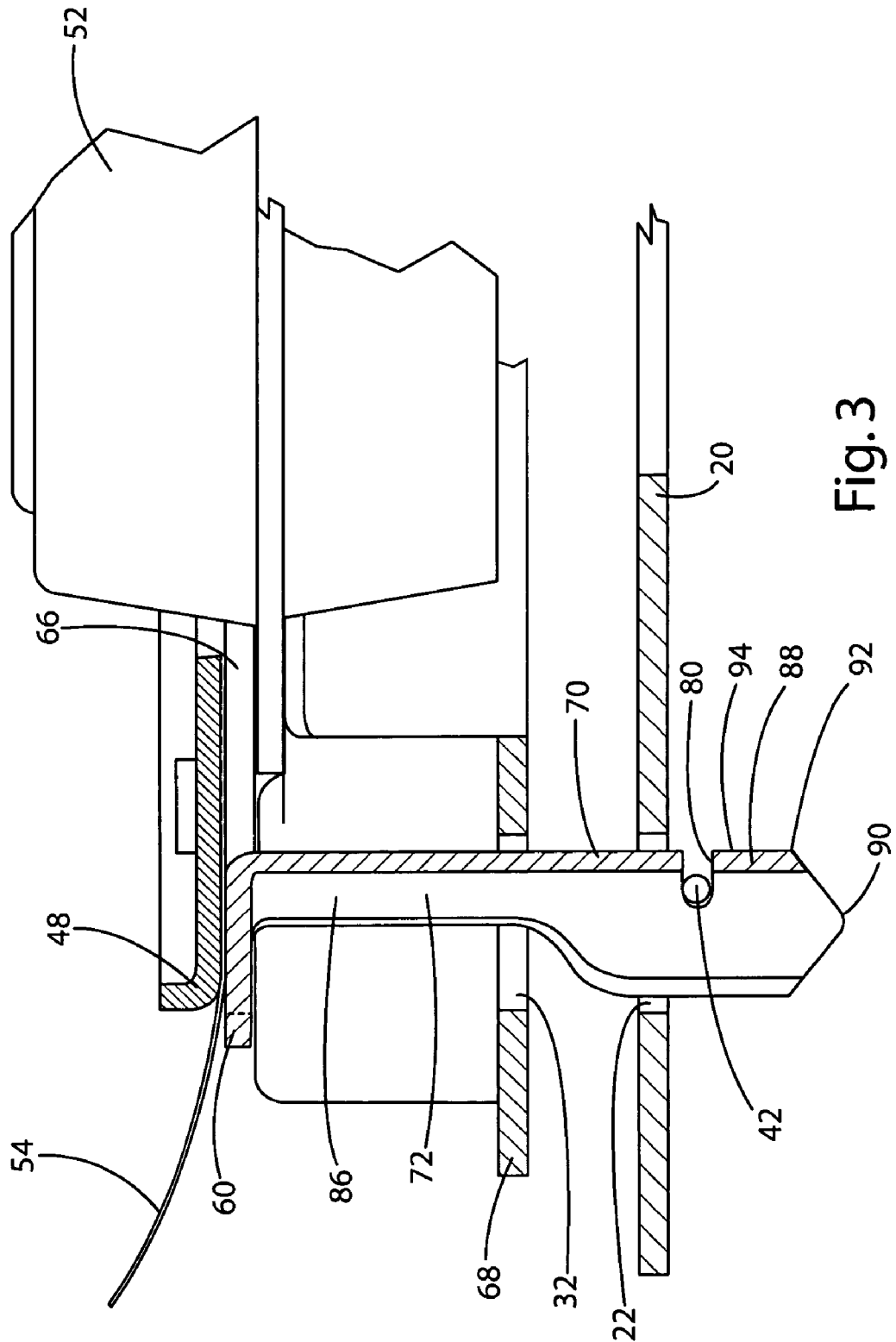
FIG. 3 is a partial sectional view of the airbag subassembly along the lines 3-3 in FIG. 2.
Figure 10:
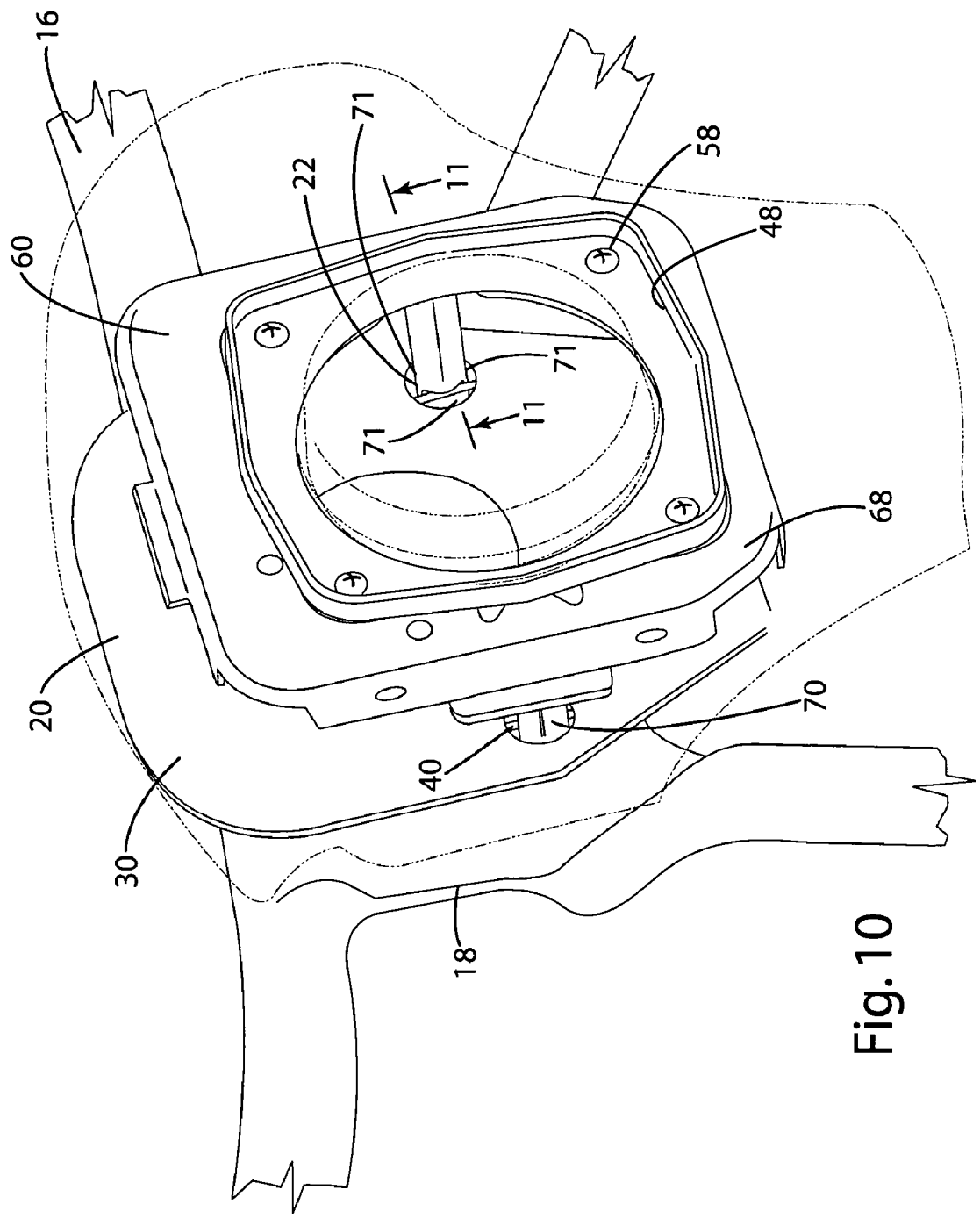
FIG. 10 is an assembled perspective view of the first alternative embodiment
Figure 11:
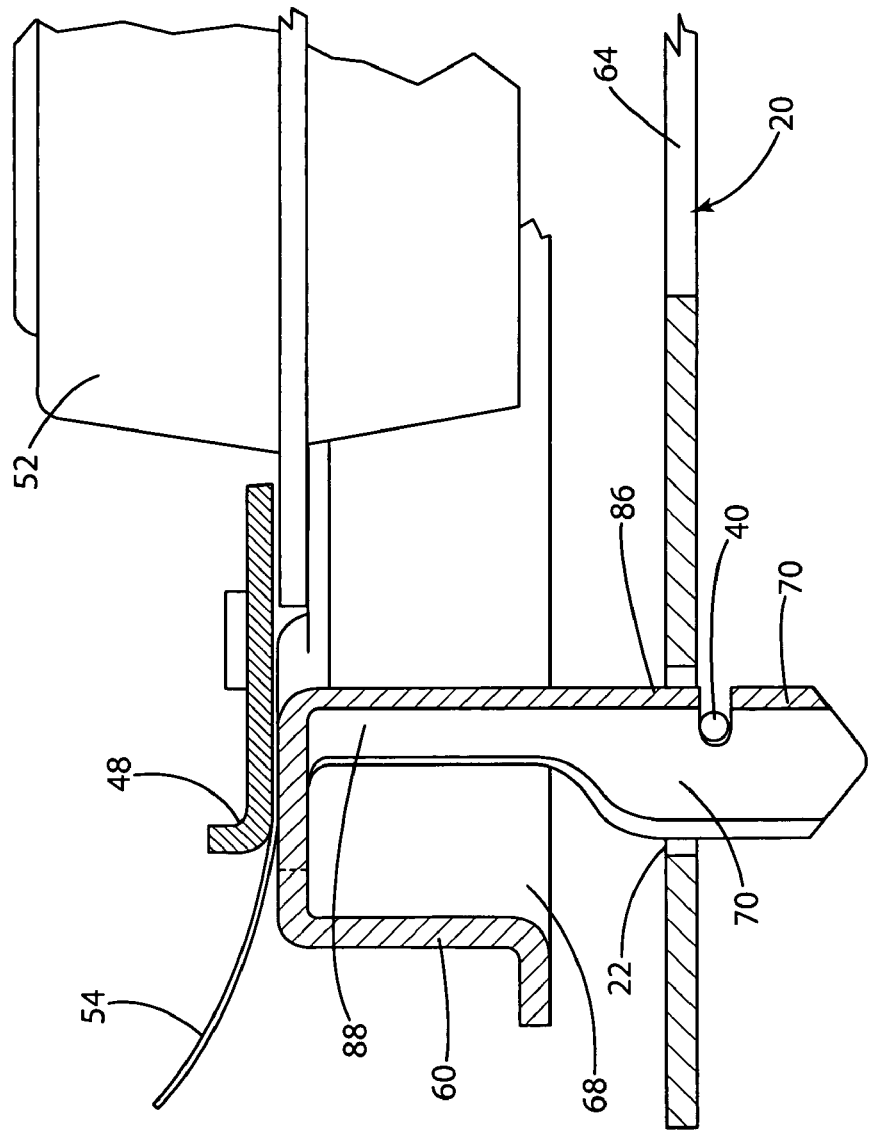
FIG. 11 is a partial sectional view of the first alternative embodiment along lines 11-11 in FIG. 10.
Figure 13:
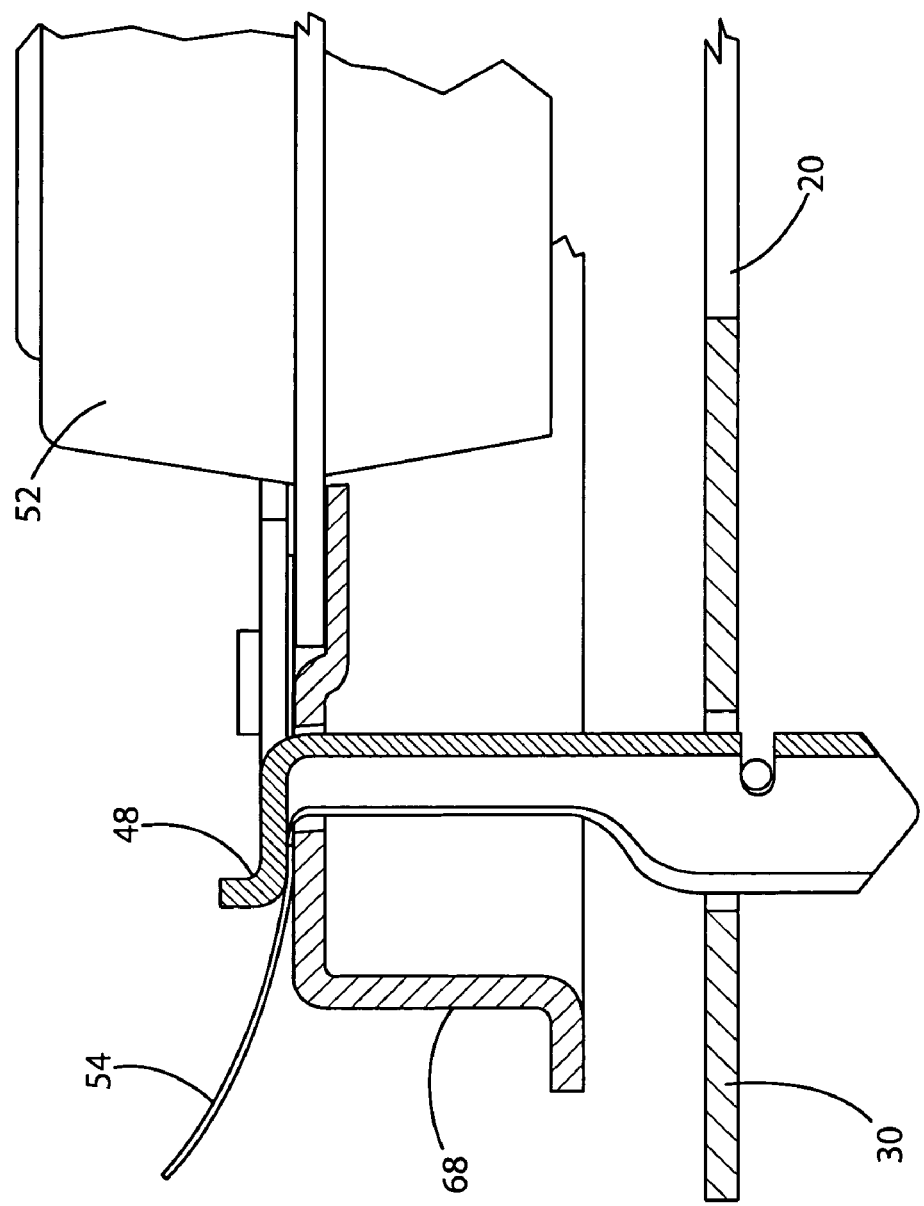
FIG. 13 is a partial sectional view of a third alternative embodiment showing the retainer ring as the bracket.

The airbag module 50 may further include a retainer ring 48, a sealing plate 66, and a housing 68, each of which may form the bracket 60. The sealing plate 66 is illustrated as forming the bracket 60 in FIGS. 1-8, and the housing is illustrated in FIGS 9-11 as forming the bracket 60. The retainer ring 48 is illustrated in FIG. 13 as the bracket 60. The retainer ring 48 holds the bag 54 to the inflator 52 and housing 68 as is well known in the art. The sealing plate 66 is optional and is typically used to prevent gases from the inflator 52 from escaping the bag 54 during detonation. The housing 68 holds the components in conjunction with the retainer ring and provides a surface for the cover 56 to attach to. The bracket 60 generally includes a base 62 which defines an inflator opening 64, and the retention members 70 extend from the base. The bracket, specifically the base 62, may take almost any shape or configuration as needed. As illustrated in FIGS. 1-3, the sealing plate 66, the housing 68, and the retainer ring 48 each include an inflator opening 64 and fastener passages 76. The fastener passages 76 are configured to allow passage of the fastener assembly 58 to assemble the airbag module as a unit that may be easily assembled and then coupled to the support structure 20. Depending on the configuration, if the sealing plate 66 or the housing 68 are located between the bracket 60 and the support structure 20, the housing or sealing plate is configured to allow passage of the retention members 70 to the apertures 22 without interference. As illustrated in FIG. 1, if the sealing plate 66 is the bracket 60, the housing 68 includes pin receivers 32 to allow the retention members 70 to pass through the apertures 22 on the support structure 20.

The retention members 70 extend from the base 62 and are integral with and formed from the same material as the base 62. In the illustrated embodiment, the base 62 forms a plane from which the retention members 70 extend approximately perpendicularly. The retention members include a first portion 86 extending from the base 62, and a second portion 88 extending from the first portion and configured to be coupled to the retention mechanism 40. The retention members 70 each include a surface 72 formed to define a cavity 74 extending approximately perpendicular to the base 62. The size and shape of the surface 72 and the cavity 74 defined by the surface may vary. The surface 72 and cavity 74 may also vary between the first and second portions 86, 88 or within the first and second portions. As illustrated in FIGS. 1-4 and 8, the surface 72 may be semicircular or arcuate, at least for the first portion, and extend to a different shape in the second portion 88, illustrated in FIGS. 1-4 and 8 as a circular shape. The surface 72 may take on a variety of other shapes or configurations such as the illustrated surface 72 in FIGS. 5, 5A and 9-10 having a first leg 100 and a second leg 102 disposed at an angle to the first leg, with a central leg 104 between the first and second legs. Of course, any other shape, such as a hexagon, octagon, or portion thereof may also be used so long as the retention members 70 are capable of being securely coupled within the apertures 22.

The surface 72 and, more specifically, the second portion 88, defines a retention cavity 80 configured to receive the retention mechanism 40, specifically the first leg 42. The retention members 70 may further define a first engagement surface 82 and a second engagement surface 84 within the retention cavity 80. In the illustrated embodiment, when the retention mechanism 40 is disposed within the retention cavity 80 to couple the retention members 70 to the bracket 60, the retention mechanism engages the first and second engagement surfaces 82, 84. The first and second engagement surfaces are separated by the cavity 74 to separate the points of engagement and improve the fit and finish of the assembled airbag by more precisely and accurately locating and retaining the retention members relative to the steering wheel armature 28. As illustrated in FIGS. 5A and 9-11, the first leg 100 includes the first engagement surface 82, and the second leg 102 defines the second engagement surface 84. In the illustrated embodiment, the retention members 70 and apertures 22 are illustrated as having matching shapes. One skilled in the art would recognize that in some embodiments, the angled retention members may fit within a circular hole or some other shape that does not match the shape of the retention members. While the matching shape may assist in retaining the airbag module 50 in a specified position, any shape and size may be used for the apertures due to the retention mechanism 40 being capable of holding the retention members within a specified position. In the preferred embodiment, the retention members 70 include at least three areas of contact 71. The areas of contact 71 keep the assembled airbag 10 situated on the steering wheel armature with the proper fit and finish. Three areas of contact 71 are illustrated in FIGS. 9 and 10 where the illustrated angular retention member is inserted into a round hole. Each area 71 is located where the retention members approach the apertures 22. In the embodiment shown in FIGS. 1-8, the round retention member 70 into a round aperture 22 has an infinite number of contact areas.

The retention members 70 may further include an insertion point 90, a lip 92, and a contact surface 94 to displace the retention mechanism 40 from the rest position during assembly until it is displaced into the retention cavity 80 in its engaged position. The insertion point 90 may have a variety of shapes and configurations, but generally includes an angled surface 91 that assists in moving the retention mechanism 40 from the rest position. As the retention members 70 are further disposed within the apertures 22, the retention mechanism passes over the lip 92 and slides along the contact surface 94 until the retention mechanism is disposed within the retention cavity.

The bracket 60 may be formed by a variety of techniques, but is generally stamped from a flat sheet of metal and then shaped. In the illustrated embodiment, the bracket 60 is first stamped from sheet metal to form a flat metal base 2 defining the inflator opening 64, with stamped retention members 4 extending into the inflator opening (FIG. 6). Of course, the stamped retention members 4 could extend outwardly from the flat metal base, but material usage is reduced by using portions of metal that would normally be removed to form the inflator opening 64. The flat metal base 2 may be formed from a piece of sheet metal through multiple stampings, but in the illustrated embodiment one stamping defines the inflator opening 64, base 62, the stamped retention members 4, and the retention cavity 80.

After the flat metal base 2 is formed into the bracket 60, in the illustrated embodiment, the stamped retention members 4 are partially shaped by curling to form shaped retention members 6 (FIG. 7). The shaped retention members 6 can take on any shape described above, or a usable shape that allows the surface 72 to define the cavity 74. After the shaped retention member 6 are curled, the shaped retention members are raised to form the retention members 70 as shown in FIG. 8. Further shaping of the retention members 70, such as to give the retention members a circular shape along the second portion 88, as illustrated in FIG. 1 may be performed. One skilled in the art would recognize that the above steps may be performed in a different order yielding the same results, or additional steps may be added depending on the techniques, processes and bracket shape in the formation of the bracket 60.

Figure 14:
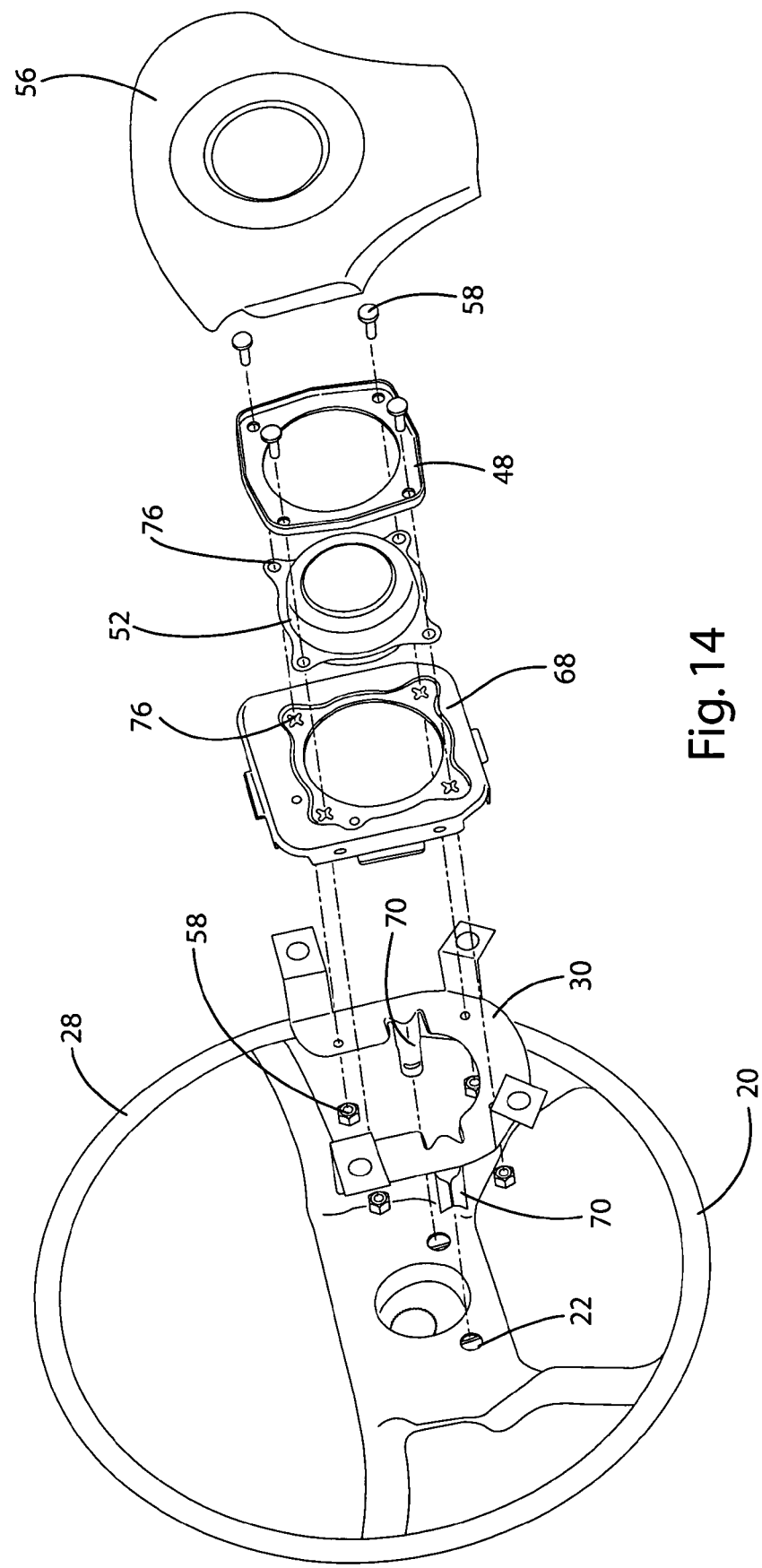
FIG. 14 is an exploded perspective view of a fourth alternative embodiment showing the horn module as the bracket.

In the fourth embodiment, the horn module 30 may act as the bracket 60 and the steering wheel armature 28 may act as the support structure 20. As illustrated in FIG. 14, the horn module 30 includes the retention members 70 and the fastener assembly 58 attaches the housing 68, airbag 54 and retainer ring 48 to the horn module 30. The sealing plate 66, as with all embodiments is optional.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A bracket in combination with an airbag subassembly, said airbag subassembly comprising an inflator and a support structure which forms a portion of a steering wheel subassembly, said bracket comprising:

a base;

an inflator opening that is positioned in an internal portion of said base and that is configured to receive said inflator of said airbag subassembly; and at least two retention members that are bent to form an angle with and extend from said base into the inflator opening, said retention members being approximately perpendicular to said base, wherein said retention members are formed integral with said base, wherein said retention members are curled in shape to form a surface defining a cavity extending perpendicular to said base, wherein each of said curled retention members comprises a curled inner surface and a curled outer surface, a retention opening which penetrates said curled inner surface and said curled outer surface and communicates with said cavity extending from said base, and a first engagement surface and a second engagement surface defined by side edges of said retention opening, and wherein said curled retention members are inserted into apertures defined by the support structure.

2. The combination of claim 1, wherein said inflator opening is provided between said retention members.

3. The combination of claim 1, wherein said retention members each include an insertion point and a lip, said insertion point extending a greater distance from said base than said lip.

4. The combination of claim 1, wherein said cavity extending from said base is at least partially located between said first and second engagement surfaces.

5. The combination of claim 1, wherein said surface includes a first leg and a second leg; and wherein said second leg is angled relative to said first leg.

6. The combination of claim 5, wherein said first leg defines said first engagement surface within said retention opening and said second leg defines said second engagement surface within said retention opening.

7. A method of forming a bracket of an airbag subassembly, said airbag subassembly comprising an airbag module, an inflator and a support structure, wherein said bracket retains said airbag module on said support structure, said method comprising the steps of:

provding a metal sheet having a base defined thereon;

defining an inflator opening in said base, said inflator opening being positioned in an internal portion of said base and being configured to receive said inflator of said airbag subassembly;

defining retention members that extend into said inflator opening;

stamping said metal sheet to remove portions of said metal sheet, including portions defined by said inflator opening;

bending said retention members to form an angle between said retention members and said base, such that said retention members are formed integral with said base; and wherein said step of bending said retention members includes the step of bending said retention members to be approximately perpendicular to said base and curling said retention members to form a surface defining a cavity extending perpendicular to said metal sheet, wherein each of said curled retention members comprises a curled inner surface and a curled outer surface, a retention opening which penetrates said curled inner surface and said curled outer surface and communicates with said cavity extending from said metal sheet, and a first engagement surface and a second engagement surface defined by side edges of said retention opening.

8. A method of forming a bracket of an airbag subassembly, said airbag subassembly comprising an airbag module, an inflator and a support structure, wherein said bracket retains said airbag module on said support structure, said method comprising the steps of:

providing a metal sheet having a base defined thereon;

defining an inflator opening in said base, said inflator opening being positioned in an internal portion of said base and being configured to receive said inflator of said airbag subassembly;

defining retention members that extend into said inflator opening;

stamping said metal sheet to remove portions of said metal sheet, including portions defined by said inflator opening;

bending said retention members to form an angle between said retention members and said base, such that said retention members are formed integral with said base; and wherein said step of bending said retention members includes the step of curling said retention members to form shaped retention members, wherein each of said curled retention members comprises a curled inner surface and a curled outer surface, a retention opening which penetrates said curled inner surface and said curled outer surface and communicates with a cavity extending from said base, and a first engagement surface and a second engagement surface defined by side edges of said retention opening.

9. The method of claim 8, wherein said step of bending said retention members includes the step of bending said shaped retention members to be approximately perpendicular to said base after said step of curling said retention members.

10. A method of forming a bracket of an airbag subassembly, said airbag subassembly comprising an air module, an inflator and a support structure, wherein said bracket retains said airbag module on said support structure, said method comprising the steps of:

providing a metal sheet having a base defined thereon;

defining an inflator opening in said base, said inflator opening being positioned in an internal portion of said base and being configured to receive said inflator of said airbag subassembly;

defining retention members that extend into said inflator opening or that extend outwardly from said base;

stamping said metal sheet to remove portions of said metal sheet, including portions defined by said inflator opening;

curling said retention members to include a curved interface at a portion of said retention members that contact said base; and bending said retention members to form an angle between said retention members and said base, such that said retention members are formed integral with said base, wherein each of said curled retention members comprises a curled inner surface and a curled outer surface, a retention opening which penetrates said curled inner surface and said curled outer surface and communicates with a cavity extending from said base, and a first engagement surface and a second engagement surface defined by side edges of said retention opening.

* * * * *